United States Patent Office 3,473,585
Patented Oct. 21, 1969

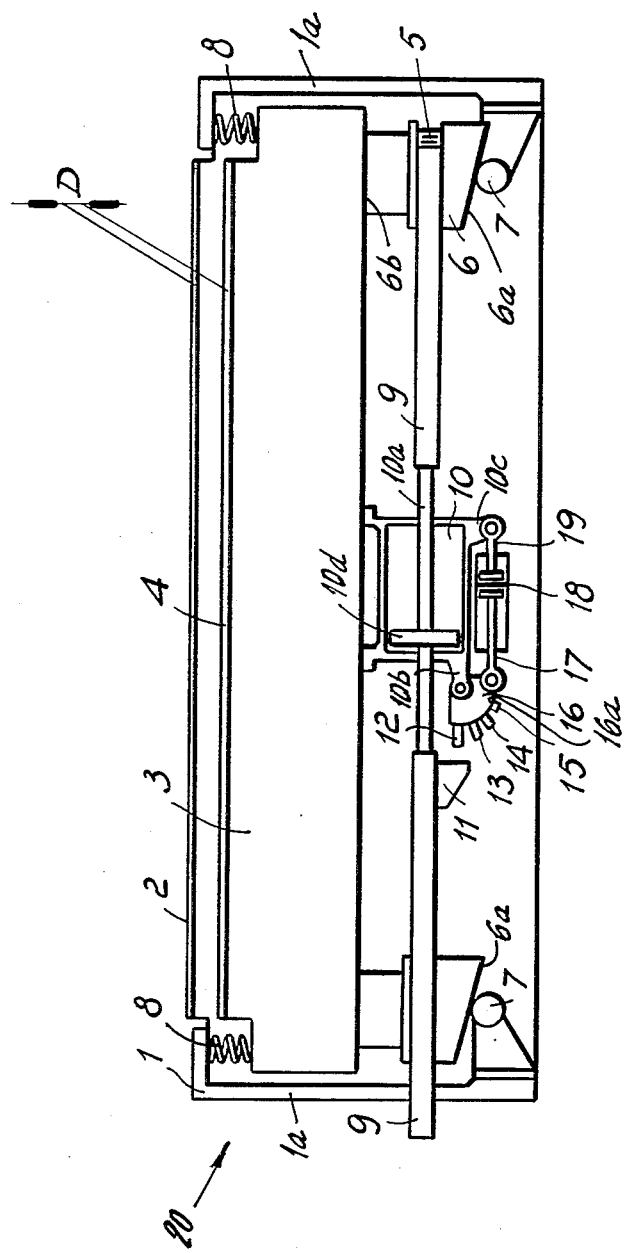

3,473,585
DEVICE FOR ADJUSTABLY SPACING THE CUTTER BLADE AND PRESSURE BAR IN A ROTARY VENEER CUTTING APPARATUS
Angelo Cremona, Viale Lombardia 275, Monza, Milan, Italy
Filed Sept. 12, 1967, Ser. No. 667,133
Claims priority, application Italy, Apr. 27, 1967, 15,432/67
Int. Cl. B27l 5/02
U.S. Cl. 144—213
11 Claims

ABSTRACT OF THE DISCLOSURE

A device for use in a rotary veneer cutting apparatus formed by a frame supporting a cutter blade and a cooperating pressure bar which are disposed in spaced parallel relationship for selectively removing varying thicknesses of the veneer removed from wood stock. A spring is supported on the frame for resiliently biasing the pressure bar away from the cutter blade. A piston rod extends from both ends of a cylinder secured to the pressure bar and has a rack located at each of its ends for moving gear wheels rotatably mounted on members bearing against the pressure bar. Each of the pressure bar bearing members has a rotatable cam surface supported on a roller mounted on the frame. A stop is located on the piston rod and a member, pivotably secured to the cylinder, is movably positionable for engagement against the stop. A double piston cylinder has a pair of axially aligned piston arms extending from its opposite ends with one of the arms secured to the other cylinder and the remaininf arm attached to the pivotable member. By regulating the fluid pressure in the double cylinders, the pivotable member can be selectively positioned for intercepting the stop on the rod. In turn the racks on the rod drive the gear wheels and position the cam surfaces of the bearing members on the rollers and the pressure bar is correspondingly selectively spaced from and in paralllel relationship with the cutter blade.

BRIEF SUMMARY OF THE INVENTION

The present invention is directed to rotary wood cutting apparatus and, more particularly, to a device for selectively spacing the cutter blade and pressure bar from each other in such apparatus.

In cutting a veneer or ply of wood from wood stock at times it is necessary to change the thickness of the layer removed. Often this required change is due to the varying quality of the wood stock from its outer surface to the duramen which progressively comes into contact with the cutter blade.

To vary the thickness in a rotary wood cutting machine it is necessary to change the feed of the cutter block and additionally to vary the distance between the cutter blade and the pressure bar. During operation these changes must be accomplished very quickly. Accordingly, the present invention provides a device which is adapted to position the pressure bar in a rotary wood cutting machine to assume a plurality of predetermined positions corresponding to the desired thicknesses of the layers to be cut from the wood stock.

For achieving rapid operation of the device embodying the present invention it is controlled by electrically operated valves and switches.

Accordingly, the primary object of the invention is to afford a device for selectively positioning the cutter blade and pressure bar in a rotary cutting machine for varying the thickness of the layer or veneer removed from a piece of wood stock.

Another object of the invention is to provide a device for quickly and positively positioning the pressure bar in relation to the cutter blade.

Still another object of the invention is to utilize selectively positionable members for forcing the pressure bar into proper position relative to the cutter blade.

A further object of the invention is to provide a simple and quickly operable device for selectively positioning the pressure bar relative to the cutter blade.

Therefore, the present invention concerns a device for removing variable thicknesses of veneer layers from wood stock in a rotary veneer cutting apparatus comprising a frame having a cutter blade and a resiliently mounted pressure bar arranged in spaced relationship. Means are secured to the pressure bar for selectively forcing it against the resilient mounting to obtain the proper spacing from the cutter blade.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE INVENTION

In the drawing, a top view is shown of a device 20 for adjustably varying the distance between a cutter blade and a pressure bar in a rotary veneer cutting apparatus. The device 20 comprises a frame or cutter block 1 having a pair of oppositely arranged end members 1a. As viewed in the drawing, at the top of the cutter block 1 a cutter blade 2 extends between the end members 1a. Spaced from and in parallel relationship with the cutter blade is a bar holder unit 3 having a pressure bar 4 along its upper edge. In the drawing the distance between the pressure bar 4 and the cutter blade 2 is designated by the dimension D. At each end of the unit 3 a spring 8 mounted on the frame contacts the unit 3 so that the pressure bar 4 is resiliently spaced from the cutter blade 2.

Located at the opposite ends of the frame end members 1a from the springs 8 are rollers 7 secured to the frame member. Positioned on each of the rollers 7 is a bearing member 6 having a "bell-shaped" cam surface 6a bearing against the lower edge of the bar holder unit 3. The "bell-shaped" cam surface 6a is formed by the lower edge of a circular wall, the edge surface lies in a plane arranged at an oblique angle to the edge of the cutter blade and pressure bar.

Secured to each of the bearing members 6 is a rotatable gear wheel 5 for revolving the cam surface 6a in contact with the roller.

At approximately the midpoint of the bar holder unit a cylinder 10 extends from and is secured to the unit. A piston rod 10a extends through the cylinder 10 and has a rack 9 positioned at each of its ends. The racks are disposed in driving engagement with the gear wheels 5 on the bearing members 6.

Mounted on the rack 9 to the left of the cylinder 10, as viewed in the drawing, is a stop 11.

At the lower corner of the cylinder 10 adjacent the stop 11 is a sector-shaped plate 16 pivotably attached to a bracket 10b extending from the cylinder. The plate 16 has a curved face 16a from which extend a quartet of threaded rods 12, 13, 14 and 15, the ends of each being at a different length from the surface 16a. It is the purpose of these rods to engage the stop 11 on the piston rod 10a for selectively determining the spacing between the pressure bar and the cutter blade.

Located below the cylinder 10 is a double piston cylinder 18 having a pair of axially aligned piston arms 17, 19 extending from its opposite ends. The piston arm 19 is attached to the cylinder 10 at bracket 10c. At the opposite end of the cylinder the piston arm 17 is attached to the plate 16. Though not shown in the drawing, electrically operated switches and valves are employed for supplying fluid into the cylinders 10 and 18 for the selective transverse positioning of the piston rod 10a and its racks 9 by means of the relative displacement of the piston arms 17 and 19 from the position shown in the drawing.

As illustrated in the drawing, the device 20 has its cutter blade 2 and pressure bar 4 disposed in the rest position. In the rest position piston 10d mounted on the rod 10a is disposed at the left end position in the cylinder 10 and maintains the stop 11 on the rack 9 out of engagement with the rods 12, 13, 14 and 15 on the plate 16. When the device is placed in operation, the proper spacing of the cutter blade and pressure bar is determined by regulating the fluid pressure in the cylinders 10 and 18 whereby the proper rod on the plate 16 is located in position to intercept the stop on the piston rod 10a which is driven to the right by the fluid pressure within the cylinder 10.

As shown, there are four different rod positions for the plate 16 and accordingly four different positions of the piston arms 17, 19 within the cylinder 18. The piston arm 17 moves the plate 16 about the pivoting point on the bracket 10b and positions one of the rods 12, 13, 14 and 15 in intercepting position in the path of the stop 11 as the piston rod 10a travels to the right from its rest position shown in the drawing to an operating position. As the piston rod 10a moves in a rightwardly direction, the racks 9 drive the gear wheels 5 which in turn rotate and position the cam surface 6a of the bearing members 6 on the rollers 7. Since the cam surface 6a of the bearing member 6 is inclined with relation to the edge of the pressure bar 4 as rotational motion is imparted to the wheels 5, the cam surface 6a revolves and its sloping surface rides on the roller 7 causing the pressure bar 4 to move either toward or away from the cutter blade depending on the relative position of the cam surface on the roller. Since the bearing member 6 is braced against the bar holder unit 3 and the roller 7 is attached to the frame 1 of the device 20, the bearing member will provide an upward pressure or bearing action against the unit 3 for maintaining the pressure bar in its proper disposition relative to the cutter blade.

While the plate 16, as illustrated, contains four rods 12, 13, 14 and 15, it will be understood that this is by way of example and additional rods could be used to afford a wider range of spacings between the cutter blade 2 and the pressure bar 4. Similarly other features of the device could be changed while still remaining within the framework of the present invention.

While a specific embodiment of the invention has been shown and described in detail to illustrate the application of the inventive principles, it will be understood that the invention may be embodied otherwise without departing from such principles.

What is claimed is:

1. A device for selectively removing variable thicknesses of veneer layers from wood stock in a rotary veneer cutting apparatus comprising a frame, a cutter blade having a cutting edge, said cutting blade mounted on said frame, a pressure bar positioned in said frame and resiliently spaced from said cutter blade, said pressure bar having an edge thereof arranged in spaced cooperating relationship with the cutting edge of said cutter blade, and means for varying the spacing between said pressure bar and cutter blade comprising a pair of spaced support assemblies for said pressure bar, each of said assemblies comprising a bearing member bearing against said frame and said pressure bar, and means for positioning said bearing member for selectively varying the spacing between said cutter blade and pressure bar in opposition to the resilient mounting of said pressure bar in said frame.

2. A device as set forth in claim 1, wherein a roller is mounted on said frame, and said bearing member has a cam surface in contact with said roller and a second surface in contact with said pressure bar, whereby said means for positioning said bearing member locates the cam surface of said bearing member in contact with said roller for selectively spacing said cutter blade and pressure bar.

3. A device as set forth in claim 2, wherein the cam surface of said bearing member is arranged in a plane disposed obliquely to the edge of said pressure bar and is rotatable about an axis positioned perpendicular to the axis of said roller.

4. A device as set forth in claim 3, wherein a rod member is positioned in said frame and extends in the longitudinal direction of said pressure bar and is in engagement with said bearing members for rotating the cam surfaces of said bearing members on said roller.

5. A device as set forth in claim 4, wherein said rod member has a rack positioned at each end of the rod.

6. A device as set forth in claim 5, wherein each of said bearing members has a rotatable gear wheel attached to it in engagement with the rack on said rod member whereby said rack drives said gear wheel and rotatably positions the cam surface of said bearing member on said roller.

7. A device as set forth in claim 6, wherein a stop is secured to said rod member and means are secured to said pressure bar for selectively positioning the stop on said rod whereby the racks on said rod in turn selectively rotate the cam surfaces on said bearing members for positioning the pressure bar in relation to the cutter blade.

8. A device as set forth in claim 7, wherein said means for movably positioning said stop comprise a pivotable member, means for securing said pivotable member to said pressure bar, said pivotable member having a selectively positionable variable contacting surface for engagement with said stop whereby when said pivotable member is pivoted its variable contacting surface selectively engages the stop on said rod for positioning the pressure bar in relation to the cutter blade.

9. A device as set forth in claim 8 wherein said means for securing said pivotable member to said pressure bar comprises a first piston cylinder secured to said pressure bar and said rod extending through said cylinder and positionable by fluid pressure exerted within the cylinder, said pivotable member secured to said first piston cylinder.

10. A device as set forth in claim 9, wherein a double piston cylinder is secured to said single piston cylinder, a pair of axially aligned piston arms extending from the opposite ends of said double piston cylinder, one of said piston arms is secured to said single piston cylinder, the other piston arm is secured to said pivotable member whereby in selectively positioning the pistons within said cylinder said piston arms locate said pivotable member in relation to the stop on said rod for selectively positioning the bearing member.

11. A device as set forth in claim 10, wherein a plurality of threaded pins extends from the variable contacting surface of said pivotable member for contacting said stop, whereby upon pivoting said pivotable member one of said pins will engage said stop on said rod for selectively determining the position of the rod and in turn locating the cam surfaces of said bearing members on said rollers for selectively spacing the pressure bar with relation to the cutter blade.

References Cited

UNITED STATES PATENTS 2,650,629   9/1953   Latimer _____ 144—213
2,659,401   11/1953   Latimer _____ 144—213

DONALD R. SCHRAN, Primary Examiner